(12) United States Patent
Van Grambezen et al.

(10) Patent No.: US 8,436,109 B2
(45) Date of Patent: May 7, 2013

(54) PROCESS FOR PRODUCING STEAM USING HEAT RECOVERED FROM A POLYMERIZATION REACTION

(75) Inventors: Pierre Van Grambezen, Brussels (BE); Mourad Abouahi, Brussels (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 13/376,861

(22) PCT Filed: Jul. 1, 2010

(86) PCT No.: PCT/EP2010/059393
§ 371 (c)(1),
(2), (4) Date: Dec. 8, 2011

(87) PCT Pub. No.: WO2011/000925
PCT Pub. Date: Jan. 6, 2011

(65) Prior Publication Data
US 2012/0088892 A1    Apr. 12, 2012

(30) Foreign Application Priority Data
Jul. 1, 2009 (EP) .................................... 09164262

(51) Int. Cl.
*C08F 2/01* (2006.01)
*C08F 10/00* (2006.01)
*C08F 2/12* (2006.01)
*B01J 19/00* (2006.01)

(52) U.S. Cl.
USPC ............................. 526/64; 526/348; 422/138

(58) Field of Classification Search ................... 526/64, 526/348; 422/138
See application file for complete search history.

(56) References Cited

U.S. PATENT DOCUMENTS

| 5,584,193 A * | 12/1996 | Biermann ........................ 62/476 |
| 2006/0063896 A1 | 3/2006 | McElvain et al. |
| 2010/0280207 A1 | 11/2010 | Van DerSchrick |

FOREIGN PATENT DOCUMENTS

WO    WO 2009010514    *    1/2009

* cited by examiner

*Primary Examiner* — William Cheung

(57) ABSTRACT

The present invention relates to a process for producing steam using heat recovered from a polymerization reaction. In particular, the present invention relates to a process for producing steam using heat recovered from a polymerization reaction for producing polyolefin, comprising the steps of: thermally contacting said polymerization reaction with a cooling fluid such that the cooling fluid removes heat from said reaction, thermally contacting at least part of said cooling fluid with at least one absorption cycle thereby transferring heat from the cooling fluid to said absorption cycle, using said absorption cycle to produce steam from a condensate, wherein the cooling fluid is used as a hot source for heating at least one evaporator and at least one generator comprised in said at least one absorption cycle. The present invention also relates to a process for cooling a polymerization reaction using a process as described herein. Said invention also relates to a polyolefin producing unit.

13 Claims, 4 Drawing Sheets

PROCESS FOR PRODUCING STEAM USING HEAT RECOVERED FROM A POLYMERIZATION REACTION

CROSS-REFERENCE TO RELATED APPLICATIONS

This application claims the benefit of PCT/EP2010/059393, filed Jul. 1, 2010, which claims priority from EP 09164262.9, filed Jul, 1, 2009.

FIELD OF THE INVENTION

The present invention relates to a process for producing steam using heat recovered from a polymerization reaction. The present invention also relates to a process for cooling a polymerization reaction.

BACKGROUND OF THE INVENTION

Polyolefins such as polyethylene and polypropylene may be prepared by particle form polymerization, such as slurry polymerization or gas phase polymerization.

The reaction of polymerization of ethylene is highly exothermic, it releases about 945 kWh per ton of polyethylene produced. Furthermore, the manufacturing units of polyethylene are major consumers of energy. Large amounts of heat from the industry are discharged into the atmosphere, which not only causes loss of energy but also adds to air pollution.

Other equipment and operations within a polyolefin manufacturing process consume energy. Noteworthy consumers of electricity within a polyolefin plant, for example, may include the pumps that circulate the liquid reaction mixture in the polymerization reactors (e.g., loop slurry reactors), the pumps that circulate the cooling medium (e.g., treated water) through the polymerization reactor jackets, the compressors that pressurize and return recycled diluent (and/or monomer) to the polymerization reactor, the blowers used to convey fluff and pellets, and the extruders that convert the polyolefin fluff to polyolefin pellets. Significant users of steam in a typical polyolefin plant may include heaters that flash liquid in the effluent of the polymerization reactor, and fractionation columns that process recovered diluent and/or monomer. In particular, the demand for steam is approximately 300 kWh per ton of polyethylene produced. Relatively large consumers of fuel gas may include activation processes (which may utilize high heat) of the polymerization catalyst, and operations that maintain adequate combustible content in the plant flare header (in the feed to the flare). In general, extensive energy is required to polymerize the monomer and comonomer to polyolefin fluff, to process recycled effluent from the reactor, and to convert the polyolefin fluff to pellets.

Therefore, the production of polyolefin is an energy-intensive process, consuming electricity, steam, fuel gas, and so on. Such energy consumption generally contributes significant cost to the production of polyolefins, as well as to the downstream products of polyolefins distributed to the customer.

WO 2009010514 describes a process for energy optimization of energy consumption in a polymerization process and to a polymerization unit. Herein the Coefficient of Performance used is the ratio of the quantity of heat produced to the electrical energy consumed, as described in the examples. All of the energy recovered from the cooling water is reused at a higher temperature, but at a cost of a lot of added mechanical/electrical energy. Herein, a gas compressor is required, which is very energy consuming.

Thus, there is still a need to improve the energy efficiency of polyolefin production processes. It is accordingly one of the objects of the present invention to overcome or ameliorate at least one of the disadvantages of the prior art, or to provide a useful alternative.

SUMMARY OF THE INVENTION

The present invention relates to a process for producing steam using heat recovered from a polymerization reaction for producing polyolefin, comprising the steps of: thermally contacting said polymerization reaction with a cooling fluid such that the cooling fluid removes heat from said reaction, thermally contacting at least part of said cooling fluid with at least one absorption cycle thereby transferring heat from the cooling fluid to said cycle, using said absorption cycle to produce steam from a condensate, wherein the cooling fluid is used as a hot source for heating at least one evaporator and at least one generator comprised in said at least one absorption cycle. The condensate is preferably steam condensate recovered from the polymerization unit (steam condensate available on site). Preferably the condensate is a recovered condensate from steam used in the polymerization unit. The steam produced can then be used in heaters that flash liquid in the effluent of the polymerization reactor, and fractionation columns that process recovered diluent and/or monomer.

In particular, the present invention provides a process for producing steam using heat recovered from a polymerization reaction for producing polyolefin, comprising the steps of:

(a) thermally contacting said polymerization reaction with a cooling fluid such that the cooling fluid removes heat from said reaction, (b) thermally contacting at least part of said cooling fluid with at least one absorption cycle utilizing an absorbate and an absorbent solution, thereby transferring heat from the cooling fluid to said absorption cycle, using said absorption cycle to produce steam from a condensate, wherein said absorption cycle comprises i) vaporizing a condensed absorbate using heat from said cooling fluid, thereby generating absorbate vapor, ii) exposing the absorbate vapor to the absorbent solution such that absorbate vapor is absorbed by the absorbent solution thereby diluting said absorbent solution and producing a diluted absorbent solution (also interchangeably referred herein as "diluted absorption solution" or "absorbate-absorbent solution" or "diluted solution or "weak absorption solution", "weak absorbent solution" or "weak solution"), iii) removing at least part of the heat from said diluted absorbent solution and using said removed heat to produce steam from a condensate thermally connected to said absorption cycle, iv) using heat from the cooling fluid to heat the diluted absorbent solution to a temperature sufficient to vaporize the absorbate to produce an absorbate vapor and a concentrated absorbent solution (also interchangeably referred herein as "concentrated solution" or "absorbent solution" or "concentrated absorption solution"); returning the absorbent solution back to be used in the absorption step (ii), and v) condensing the absorbate vapor to form a condensed absorbate and returning the condensed absorbate to be vaporized in step (i).

In an embodiment, the process further comprises the step of further removing at least part of the heat from said diluted absorbent solution after step (iii) and using said removed heat to heat the concentrated absorbent solution obtained in step (iv) before returning said concentrated absorbent solution to the absorption step (ii).

In an embodiment, the polymerization reaction is performed in a polymerization reactor and comprises the steps of
introducing into said reactor one or more olefin reactants, polymerization catalysts and diluents, and while circulating said reactants, catalysts and diluents,
polymerizing said one or more olefin reactants to produce a polymer slurry comprising essentially liquid diluent and solid olefin polymer particles,
controlling the reactor temperature using the cooling fluid and recovering at least a portion of the thermal energy from said cooling fluid using said absorption cycle in thermal contact with said cooling fluid,
allowing said polymer slurry to settle, and
discharging the settled polymer slurry out of said reactor.

The present invention also concerns the use of a process according to the invention for cooling a polymerization reaction for producing polyolefin The present invention also concerns a polyolefin producing unit, comprising:
means for feeding monomer, a co-monomer, diluent, a polymerization catalyst and optionally hydrogen to at least one polymerization reactor;
a reactor system comprising at least one polymerization reactor defining a flow path for a polymer slurry, said reactor being provided with heat jacket for cooling said reactor,
one or more lines for discharging said polymer slurry out of said polymerization reactor,
wherein said at least one polymerization reactor is thermally coupled with a generator and an evaporator comprised in at least one absorption heat transformer, said heat transformer further comprising an absorber which is thermally coupled to at least one steam production unit.

In an embodiment, said absorption heat transformer is an absorbent/absorbate-comprising loop including a serially connected: condenser, evaporator, absorber, and at least one generator, wherein the absorber is serially connected to a heat exchanger which is thermally connected to a steam production unit.

In an embodiment said absorption heat transformer is an absorbent/absorbate-comprising loop including a serially connected condenser, pump, evaporator, absorber, recuperative heat exchanger (economizer), expansion valve, and at least one generator, wherein the generator is also serially connected to the economizer, and wherein the absorber is serially connected to a heat exchanger which is thermally connected to a steam production unit.

The present invention also encompasses a process for cooling a polymerization reaction using a process according to the invention.

The present invention allows reducing energy consumption in a polyolefin production process. The present invention improves plant efficiency and permits to recover wasted energy resources.

The generator is advantageously supplied with waste heat from a waste heat source to vaporize the working fluid from a solution of an absorbent and working fluid, coming from the absorber.

The condenser advantageously condenses the vaporized working fluid coming from the generator.

The evaporator advantageously evaporates the liquidized working fluid pumped thereto from the condenser at higher pressure, by extracting heat from the waste heat source.

The absorber advantageously absorbs the working fluid vapor coming from the evaporator using an absorbent, also generating heat.

The present invention will be further disclosed in detail hereunder. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION

Figure 1:
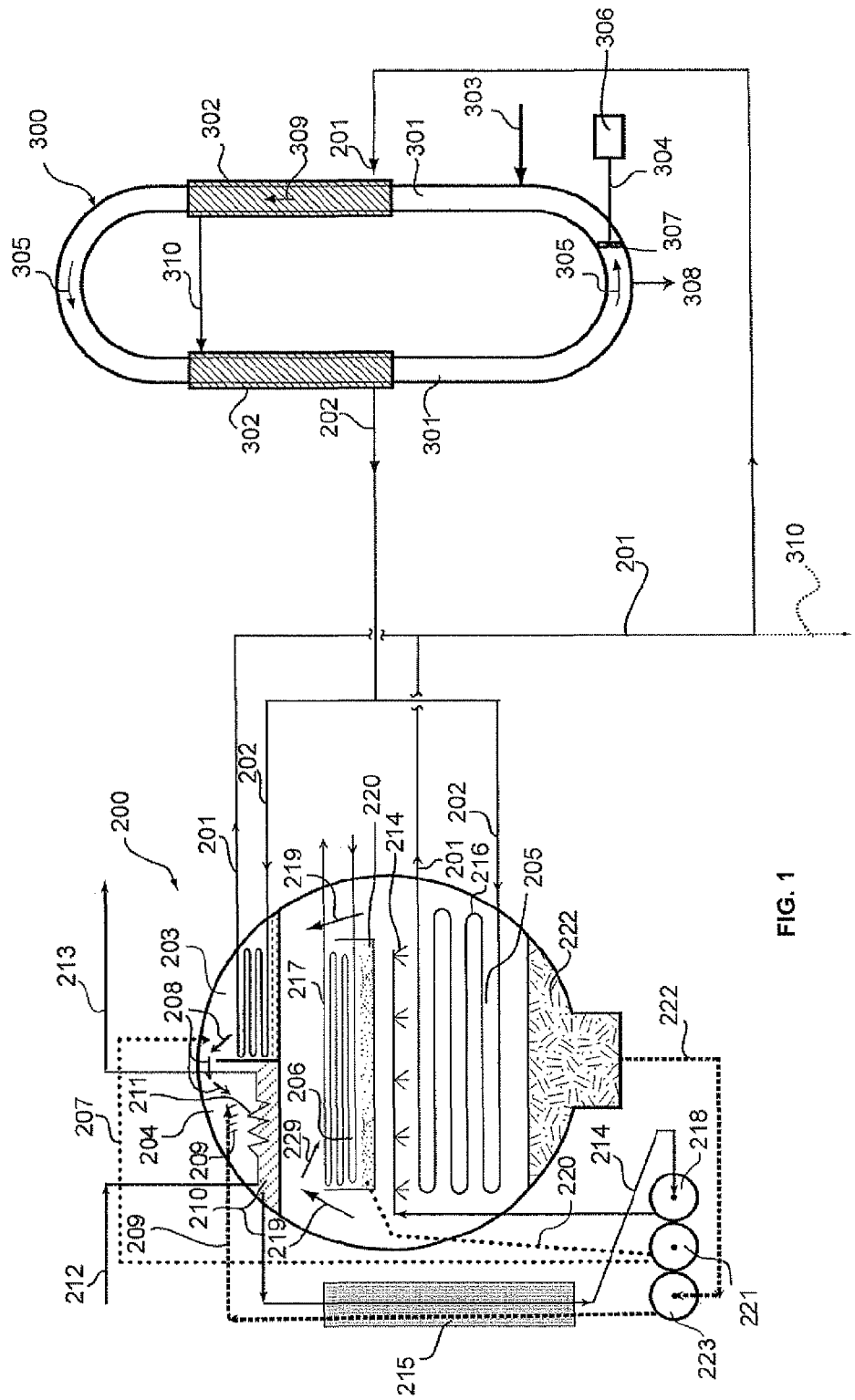
FIG. 1 is a schematic representation of a basic configuration of the application of a single effect absorption heat transformer for producing steam, according to an embodiment of the present invention.

The invention provides a process and a system for producing steam using heat recovered from a polymerization reaction for producing polyolefin. According to the present invention, the cooling fluid from the polymerization reaction is used as a heat source in at least one single stage (single effect) absorption cycle of an absorption heat transformer utilizing an absorbate and an absorbent solution. In an embodiment the absorbate and the absorbent solution is a binary fluid (also referred herein as "binary working fluid").

As used herein, the term "working fluid' refers to the medium evolving within a thermodynamic cycle.

The heat from the cooling fluid of the polymerization reaction is used at two different steps of the absorption cycle. It is used to heat the evaporator and it is also used to heat the generator of the absorption heat transformer. Evaporation of the condensed absorbate takes place in the evaporator when said absorbate takes from the cooling water of the reactor, the heat that it has absorbed in its cooling circuit. Similarly the absorbate absorbent solution in the generator is heated using the heat that it has absorbed in its cooling circuit.

The process according to the invention comprises the steps of:
(a) thermally communicating said polymerization reaction with a cooling fluid such that the cooling fluid removes heat from said reaction,
(b) thermally communicating (also referred herein as "thermally contacting") the cooling fluid of the polymerization reaction with the condensate from a binary working fluid in an evaporator whereby the condensate is at least partly vaporized to form vapor;
(c) contacting said vapor with said binary working fluid in an absorber wherein the binary working fluid is diluted by absorption of said vapor;
(d) providing heat exchanging contact between the diluted binary working fluid in the absorber, and a source of condensate whereby the condensate is converted to steam at a higher temperature,
(e) using heat from the cooling fluid of the polymerization reaction to heat the diluted binary working fluid in a generator to a temperature sufficient to produce an absorbate vapor and a concentrated binary working fluid (also referred as "rich binary working fluid"); returning the concentrated binary working fluid back to be used in the absorption step (c) preferably after being heated in a recuperative heat exchanger where heat is exchanged with the dilute binary working fluid from said absorber;

(f) condensing the absorbate vapor by heat exchanging contact with a lower temperature condenser to form a condensed absorbate and returning the condensed absorbate to be vaporized in the evaporator of step (b).

Preferably, said at least one absorption cycle comprises two pressure zones.

In a preferred embodiment, in step (f) the condensed absorbate is pumped at a higher pressure before being returned to the evaporator of step (b).

In a preferred embodiment, the concentrated binary working fluid obtained in the generator of step (e) is first pumped at a higher pressure and then heated in the recuperative heat exchanger (economizer) before being returned back to the absorber of step (c).

According to a preferred embodiment, the process comprises the steps of:

(a) thermally contacting said polymerization reaction with a cooling fluid such that the cooling fluid removes heat from said reaction, (b) thermally contacting the cooling fluid of the polymerization reaction with the condensate from the binary working fluid in an evaporator whereby the condensate is at least partly vaporized to form vapor;

(c) contacting said vapor with said binary working fluid in an absorber wherein the binary working fluid is diluted by absorption of said vapor;

(d) providing heat exchanging contact between the diluted binary working fluid in the absorber, and a source of condensate whereby the condensate is converted to steam at a higher temperature, (d1) further providing heat exchanging contact between the diluted binary working fluid and a returning concentrated binary working fluid in a recuperative heat exchanger (economizer);

(d2) expending said diluted binary working fluid in an expansion valve, (e) using heat from the cooling fluid of the polymerization reaction to heat the expended diluted binary working fluid in a generator to a temperature sufficient to produce an absorbate vapor and a concentrated binary working fluid; (e1) pumping the concentrated binary working fluid at a higher pressure before heating said pumped concentrated binary working fluid in the recuperative heat exchanger of step (d1) and returning said concentrated binary working fluid to the absorber of step (c);

(f) condensing the absorbate vapor by heat exchanging contact with a lower temperature condenser to form a condensed absorbate, and (f1) pumping the condensed absorbate to a higher pressure before being returned to the evaporator of step (b).

In an embodiment the steam produced from the steam condensate using the absorption cycle is low pressure steam. In an embodiment, if high pressure is desired, said low pressure steam may be compressed to obtain high pressure steam, and a temperature increase. This can be achieved by either combining the produced low pressure steam with high pressure steam using a thermocompressor or by mechanically compressing said low pressure steam. Preferably the steam produced is recompressed using a thermocompressor.

In another embodiment, the present process comprises the step of using the steam produced in step (iii) of a first absorption cycle as a hot source for a second absorption cycle, and using said second absorption cycle for producing steam from a condensate. In this embodiment, the cooling fluid from the polymerization reaction is used as a heat source in a first absorption cycle which is used to produce steam from a condensate, and said produced steam is used as a heat source in a second absorption cycle which is used to produce steam from a condensate. The heat from the cooling fluid of the polymerization reaction is used at two different steps of the first absorption cycle. It is used to heat the evaporator and it is also used to heat the generator. The heat from the steam produced using the first absorption cycle is used at two different steps of the second absorption cycle. It is used to heat the evaporator and it is also used to heat the generator. Preferably, the steam produced using the second absorption cycle is high pressure steam.

Preferably, said second absorption cycle comprises two pressure zones.

According to a particular embodiment, said second absorption cycle utilizes an absorbate and an absorbent solution, and comprises the steps of:

i1) vaporizing a condensed absorbate using heat from the steam produced using the first absorption cycle, thereby generating absorbate vapor, ii1) exposing the absorbate vapor to the absorbent solution such that absorbate vapor is absorbed by the absorbent solution thereby diluting it and producing a diluted absorbent solution, iii1) removing at least part of the heat from said diluted absorbent solution and using said removed heat to produce steam from a condensate thermally connected to said absorption cycle, iv1) using heat from the steam produced using the first absorption cycle, to heat the diluted absorbent solution to a temperature sufficient to vaporize the absorbate to produce an absorbate vapor and a concentrated absorbent solution; returning the concentrated absorbent solution back to be used in the absorption step (ii1)

v1) condensing the absorbate vapor to form a condensed absorbate and returning the condensed absorbate to be vaporized in step (i1).

In a particular embodiment, said second absorption cycle further comprises the step of further removing at least part of the heat from said diluted absorbent solution after step (iii1) and using said removed heat to heat the concentrated absorbent solution obtained in step (iv1) before returning said concentrated absorbent solution to the absorption step (ii1).

Preferably, the steam produced in step (iii1) is high pressure steam.

In a particular embodiment, the process comprising the first and second absorption cycles comprises the steps of:

(a) thermally communicating said polymerization reaction with a cooling fluid such that the cooling fluid removes heat from said reaction, (b) thermally communicating (also referred herein as "thermally contacting") the cooling fluid of the polymerization reaction with the condensate from a binary working fluid in a first evaporator whereby the condensate is at least partly vaporized to form vapor;

(c) contacting said vapor with said binary working fluid in a first absorber wherein the binary working fluid is diluted by absorption of said vapor;

(d) providing heat exchanging contact between the diluted binary working fluid in the first absorber, and a source of condensate whereby the condensate is converted to steam at a higher temperature, (e) using heat from the cooling fluid of the polymerization reaction to heat the diluted binary working fluid in a first generator to a temperature sufficient to produce an absorbate vapor and a concentrated binary working fluid; returning the concentrated binary working fluid back to be used in the absorption step (c) preferably after being heated in a first recuperative heat exchanger where heat is exchanged with the dilute binary working fluid from said first absorber;

(f) condensing the absorbate vapor by heat exchanging contact at a first lower temperature condenser to form a condensed absorbate and returning the condensed absorbate to be vaporized in the first evaporator of step (b) and (g) thermally contacting the steam produced in step (d) with the condensate from a binary working fluid in a second evaporator whereby the condensate is at least partly vaporized to form vapor;

(h) contacting said vapor with said binary working fluid in a second absorber wherein the binary working fluid is diluted by absorption of said vapor;

(i) providing heat exchanging contact between the diluted binary working fluid in the second absorber, and a source of condensate whereby the condensate is converted to steam at a higher temperature, (j) using heat from the steam produced in step (d) to heat the diluted binary working fluid in a second generator to a temperature sufficient to produce an absorbate vapor and a concentrated binary working fluid; returning the concentrated binary working fluid back to be used in the absorption step (h) preferably after being heated in a second recuperative heat exchanger where heat is exchanged with the dilute binary working fluid from said second absorber;

(k) condensing the absorbate vapor by heat exchanging contact at a second lower temperature condenser to form a condensed absorbate and returning the condensed absorbate to be vaporized in the second evaporator of step (g).

Preferably, said first absorption cycle comprises two pressure zones, and said second absorption cycle comprises two pressure zones In a preferred embodiment, in step (k) the condensed absorbate in pumped at a higher pressure before being returned to the second evaporator of step (g).

In a preferred embodiment, the concentrated binary working fluid obtained in the second generator of step (j) is first pumped at a higher pressure and then heated in the recuperative heat exchanger (economizer) before being returned back to the second absorber of step (h).

According to a preferred embodiment, the process using the two stages absorption cycles comprises the steps of:

(a) thermally contacting said polymerization reaction with a cooling fluid such that the cooling fluid removes heat from said reaction, (b) thermally contacting the cooling fluid of the polymerization reaction with the condensate from the binary working fluid in a first evaporator whereby the condensate is at least partly vaporized to form vapor;

(c) contacting said vapor with said binary working fluid in a first absorber wherein the binary working fluid is diluted by absorption of said vapor;

(d) providing heat exchanging contact between the diluted binary working fluid in the first absorber, and a source of condensate whereby the condensate is converted to steam at a higher temperature, (d1) further providing heat exchanging contact between the diluted binary working fluid and a returning concentrated binary working fluid in a first recuperative heat exchanger (economizer);

(d2) expending said diluted binary working fluid in a first expansion valve, (e) using heat from the cooling fluid of the polymerization reaction to heat the expended diluted binary working fluid in a first generator to a temperature sufficient to produce an absorbate vapor and a concentrated binary working fluid; (e1) pumping the concentrated binary working fluid to a higher pressure before heating said pumped concentrated binary working fluid in the first recuperative heat exchanger of step (d1) and returning said concentrated binary working fluid to the first absorber of step (c);

(f) condensing the absorbate vapor by heat exchanging contact at a first lower temperature condenser to form a condensed absorbate, and (f1) pumping the condensed absorbate to a higher pressure before being returned to the first evaporator of step (b);

(g) thermally contacting the steam produced in step (d) with the condensate from the binary working fluid in a second evaporator whereby the condensate is at least partly vaporized to form vapor;

(h) contacting said vapor with said binary working fluid in a second absorber wherein the binary working fluid is diluted by absorption of said vapor;

(i) providing heat exchanging contact between the diluted binary working fluid in the second absorber, and a source of condensate whereby the condensate is converted to steam at a higher temperature, (i1) further providing heat exchanging contact between the diluted binary working fluid and a returning concentrated binary working fluid in a second recuperative heat exchanger;

(i2) expending said diluted binary working fluid in a second expansion valve, (j) using heat from the steam produced in step (d) to heat the expended diluted binary working fluid in a second generator to a temperature sufficient to produce an absorbate vapor and a concentrated binary working fluid; (j1) pumping the concentrated binary working fluid at a higher pressure before heating said pumped concentrated binary working fluid in the second recuperative heat exchanger of step (i1) and returning said concentrated binary working fluid to the second absorber of step (h);

(k) condensing the absorbate vapor by heat exchanging contact at a second lower temperature condenser to form a condensed absorbate, and (k1) pumping the condensed absorbate to a higher pressure before being returned to the second evaporator of step (g).

In an embodiment, the absorbent/absorbate solution is a binary working fluid selected from the group comprising lithium-bromide (LiBr)/water and ammonia/water, or alcohol/alcohol, alcohol/amides, alcohol and ketones, amine/alcohol, alcohol/salt.

Preferably, the absorbate is water and the absorbent solution is a solution of LiBr in water. More preferably, the concentration LiBr absorbent solution is at least 58% by weight, i.e.; an aqueous solution comprising at least 58% of lithium bromide by weight. Yet more preferably the concentration of the LiBr absorbent solution is ranging from 58% to 65% by weight.

In a particular embodiment of the process using a single or double absorption cycles, the polymerization reaction is performed in a reactor and comprises the steps of introducing into said reactor one or more olefin reactants, polymerization catalysts and diluents, and while circulating said reactants, catalysts and diluents, polymerizing said one or more olefin reactants to produce a polymer slurry comprising essentially liquid diluent and solid olefin polymer particles, controlling the reactor temperature using the cooling fluid and recovering at least a portion of the thermal energy from said cooling fluid by the working fluid in thermal contact with said cooling fluid, allowing said polymer slurry to settle, and discharging the settled polymer slurry out of said reactor.

The present invention is applicable to any process producing an effluent comprising a slurry of particulate polymer solids suspended in a liquid medium comprising a diluent and unreacted monomer. Such reaction processes include those which have come to be known in the art as particle form polymerizations.

The present invention is particularly suitable for polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene and the like.

The polymerization reaction can be carried out at a temperature of from 50 to 120° C., preferably at temperature of from 70 to 115° C., more preferably at temperature of from 80 to 110° C., and at a pressure of from 20 to 100 bar, preferably at pressure of from 30 to 50 bar, more preferably at pressure of 37 to 45 bar.

In a preferred embodiment, the present invention is particularly suitable for the polymerization of ethylene in isobutane diluent. Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene. In another embodiment the present invention is described in terms of the polymerization of ethylene for manufacturing bimodal polyethylene (PE). "Bimodal PE" refers to PE that is manufactured using two reactors, which are connected to each other in series.

Ethylene polymerizes in a liquid diluent in the presence of a catalyst, optionally a co-catalyst, optionally a co-monomer, optionally hydrogen and optionally other additives, thereby producing polymerization slurry.

As used herein, the term "polymerization slurry" or "polymer slurry" or "slurry" means substantially a multi-phase composition including at least polymer solids and a liquid phase and allows for a third phase (gas) to be at least locally present in the process, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include but are not limited to hydrocarbon diluents such as aliphatic, cycloaliphatic and aromatic hydrocarbon solvents, or halogenated versions of such solvents. The preferred solvents are $C_{12}$ or lower, straight chain or branched chain, saturated hydrocarbons, $C_5$ to $C_9$ saturated alicyclic or aromatic hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, and xylene. In a preferred embodiment of the present invention, said diluent is isobutane. However, it should be clear from the present invention that other diluents may as well be applied according to the present invention.

Suitable catalysts are well known in the art. According to the present invention the term "catalyst" is defined herein as a substance that causes a change in the rate of a co-polymerization reaction without itself being consumed in the reaction. Examples of suitable catalysts include but are not limited to chromium oxide such as those supported on silica or aluminium, organometal catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

According to another embodiment, the process according to the present invention may also be applied in a double loop polymerization reactor consisting of two liquid full loop reactors, comprising a first and a second reactor connected in series by one or more settling legs of the first reactor connected for discharge of slurry from the first reactor to said second reactor.

The invention also provides a system for cooling a reaction of olefin polymerization, characterized in that an absorption heat transformer is used to remove heat from said polymerization reaction. In particular, the present invention provides a process for cooling a polymerization reaction comprising the steps of: removing heat from said polymerization reaction, using an absorption heat transformer and using said pump to produce steam.

The present invention also provides polyolefin producing unit, comprising: means for feeding monomer, a co-monomer, diluent, a polymerization catalyst and optionally hydrogen to at least one polymerization reactor; a reactor system comprising at least one polymerization reactor defining a flow path for a polymer slurry, one or more lines for discharging said polymer slurry out of said polymerization reactor, wherein said at least one polymerization reactor is thermally coupled with a generator and an evaporator comprised in at least one absorption heat transformer, said heat transformer further comprising an absorber which is thermally coupled to at least one steam production unit.

In a preferred embodiment, said polyolefin producing unit, comprises:
  means for feeding monomer, a co-monomer, diluent and optionally hydrogen to at least one polymerization reactor;
  means for feeding a polymerization catalyst in said at least one polymerization reactor,
  a reactor system comprising at least one polymerization reactor defining a flow path for a polymer slurry, said slurry consisting essentially of at least one monomer, a co-monomer, a polymerization catalyst, liquid diluent and solid olefin co-polymer particles,
  one or more lines for discharging said polymer slurry out of said polymerization reactor,
  a diluent/monomer recovery system configured to separate a majority of the liquid diluent from the slurry discharged from said at least one polymerization reactor;

a fractionation system configured to process a portion of the liquid diluent discharged from the diluent/monomer recovery system and to provide recovered liquid diluent; and an extrusion/loadout system having an extruder/pelletizer configured to extrude and pelletize polyolefin particles recovered from the slurry in the diluent/monomer recovery system, wherein said at least one polymerization reactor is thermally coupled with a generator and an evaporator comprised in at least one absorption heat transformer, said heat transformer further comprising an absorber which is thermally coupled to at least one steam production unit.

In an embodiment, a steam condensate line is configured to be in thermal contact with the heat exchanger in the absorber of at least one absorption heat transformer. In an embodiment, a compressor can be further coupled to said absorption heat transformer, to produce high pressure steam from the steam produced using said at least one absorption heat transformer. Preferably said compressor is a thermocompressor.

FIG. 1 represents a single loop reactor 300 which is operably connected to a single stage (or single effect) absorption heat transformer 200, according to an embodiment of the invention. The single loop reactor 300 comprises interconnected pipes 301. It will be understood that while the loop reactor 300 is illustrated with two vertical pipes 301, said loop reactor 300 may be equipped with more pipes, such as four or more pipes, for example six vertical pipes, for example between four and 20 vertical pipes. The vertical sections of the pipe segments 301 are provided with heat jackets 302. Polymerization heat is extracted by means of cooling water circulating 309 in these jackets 302 of the reactor 300.

Reactants such as diluent, monomer, optional co-monomers and reaction additives can be introduced into the reactor 300 by line 303. Catalyst, optionally in conjunction with a co-catalyst or activation agent, can be injected in the reactor.

The polymerization slurry is directionally circulated throughout the loop reactor 300 as illustrated by the arrows 305 by one or more pumps, such as axial flow pump 304. The pump may be powered by an electric motor 306. As used herein the term "pump" includes any device from compressing driving, raising the pressure of a fluid, by means for example of a piston or set of rotating impellers 307.

The reactor 300 can be further provided with one or more settling legs (not shown) for discharging the polymer slurry to a product recovery zone 308.

The settling legs can be provided with product take off or discharge valves. The discharge valves may be any type of valve, which can permit continuous or periodical discharge of polymer slurry, when it is fully open. An angle valve or ball valves may be suitably used. For example, the valve may have such a structure that solid matter is prevented from accumulating or precipitating at the main body portion of the valve. However, the type and structure of the discharge valve can be selected by those skilled in the art as required. A part or the totality of the leg is discharged at each opening of the discharge valve. Polymer slurry settled in the settling legs may be removed by means of one or more product recovery lines, e.g. to the product recovery zone 308.

The settled polymer slurry may be continuously or periodically discharged from the loop reactor 300 into said product recovery zone 308. As used herein "product recovery zone" includes but is not limited to heated or not heated flash lines, flash tank, cyclones, filters and the associated vapor recovery and solids recovery systems or transfer lines to another reactor or said other reactor when several reactors are connected in series.

When no reactor is present downstream of said settling legs, the extracted slurry may be depressurized and transferred through for example heated or not heated flash lines to a flash tank where the polymer and the unreacted monomer and/or co-monomer and diluent are separated. The degassing of the polymer may be further completed in a purge column.

When at least one reactor is present downstream of said settling legs, the extracted slurry is transferred through transfer lines connected to said settling legs to the next reactor. Transfer is made possible by injecting the slurry in the downstream reactor in a point where the pressure is lower than the pressure at the outlet of the settling legs.

The present invention encompasses single or more loop reactors thermally connected to at least one absorption heat transformer according to the present invention, wherein said loop reactors can be used in parallel or in series.

The vertical sections of the pipe segments 301 are provided with heat jackets 302. Polymerization heat is extracted by means of cooling water circulating 309 in these jackets 302. The cooling water 201 enters into jacket 302 of a vertical pipe 301 and circulates 309 through next reactor jacket 302 via interconnecting pipe 310. The cooling water 202 exits from the reactor jacket. The cooling water 202 is further thermally connected to an absorption heat transformer 200. Optionally, the cooling water 202 can also be thermally connected in parallel to a separate cooling system (not shown) such as evaporative coolers. This is schematically illustrated by arrows 310. This provides the advantage of having a backup system when the absorption heat transformer is down for maintenance for example.

The absorption heat transformer 200 includes an evaporator 203 and an absorption section 204, a generator 205 and a condenser 206. Cooling water 202 from the reactor is in thermal contact with the evaporator 203 and the generator 205. The absorption heat transformer uses an absorbate/absorbent binary fluid as working fluid.

The absorbate can be water and the absorbent can be an aqueous solution of lithium bromide.

The absorbate is metered 207 into the evaporator section 203. The heat from the cooling water 202 in thermal contact with the evaporator 203 evaporates the absorbate to create absorbate vapor schematically illustrated by arrows 208. The cooling water is therefore cooled by thermal contact with the evaporator 203 and is returned to cool the reactor as shown by arrows 201.

The absorbate vapor 208 enters the absorber 204 (also referred herein as the absorption section 204). In the absorption section 204, the introduced absorbent solution 209 readily absorbs the absorbate vapor 208. As the absorbent solution 210 absorbs the absorbate, it becomes diluted herein referred as "weak solution" (hereinafter interchangeably also referred as the "diluted absorbent solution" or "absorbate-absorption solution" or "weak absorption solution", or "diluted absorption solution" or "diluted solution" 210).

The weak solution 210 is cooled in a heat exchanger 211 comprised in the absorber 204. The heat from the weak solution 210 is used in said heat exchanger 211 to produce steam 213 from a steam condensate 212 recovered from the polymerization unit. The cooled weak solution 210 is sent to an economizer 215 where it is further cooled by heat exchange and the further cooled weak solution 214 is sent to the generator 205 through expansion valve 218.

The generator 205 includes a heat pipe 216 through which circulate water 202 from the reactor 300. The generator 205 is also in contact with a condenser 206. The condenser 206 requires a stream of cool water usually from a cooling system 217. The weak solution 214 is introduced into the generator 205 where it is boiled. The boiling action changes the absorbate to an absorbate vapor 219 which leaves the weak solution which becomes concentrated 222 upon boiling, hereinafter referred as "concentrated solution" (also interchangeably referred herein as "absorbent solution" or "concentrated absorbent solution" or "concentrated absorption solution"). Absorbate vapor 219 is attracted to the condenser 206 coils 217. Preferably cold water circulates through coils 217. The absorbate vapor is condensed 229 to a liquid pond 220 where it gathers and is pumped back with pump 221 to the evaporator section 203. The absorbent solution becomes concentrated 222 and is pumped 223 back through economizer 215 where it is preheated. In the economizer 215 heat is exchanged between the weak solution 210 and the concentrated solution 222. The preheated concentrated absorbent solution 209 is then returned to the absorption section 204.

The system according to FIG. 1 allows the efficient use of heat generated during the polymerization reaction to produce steam from a steam condensate recovered from the polymerization unit using an absorption heat transformer.

Figure 2:
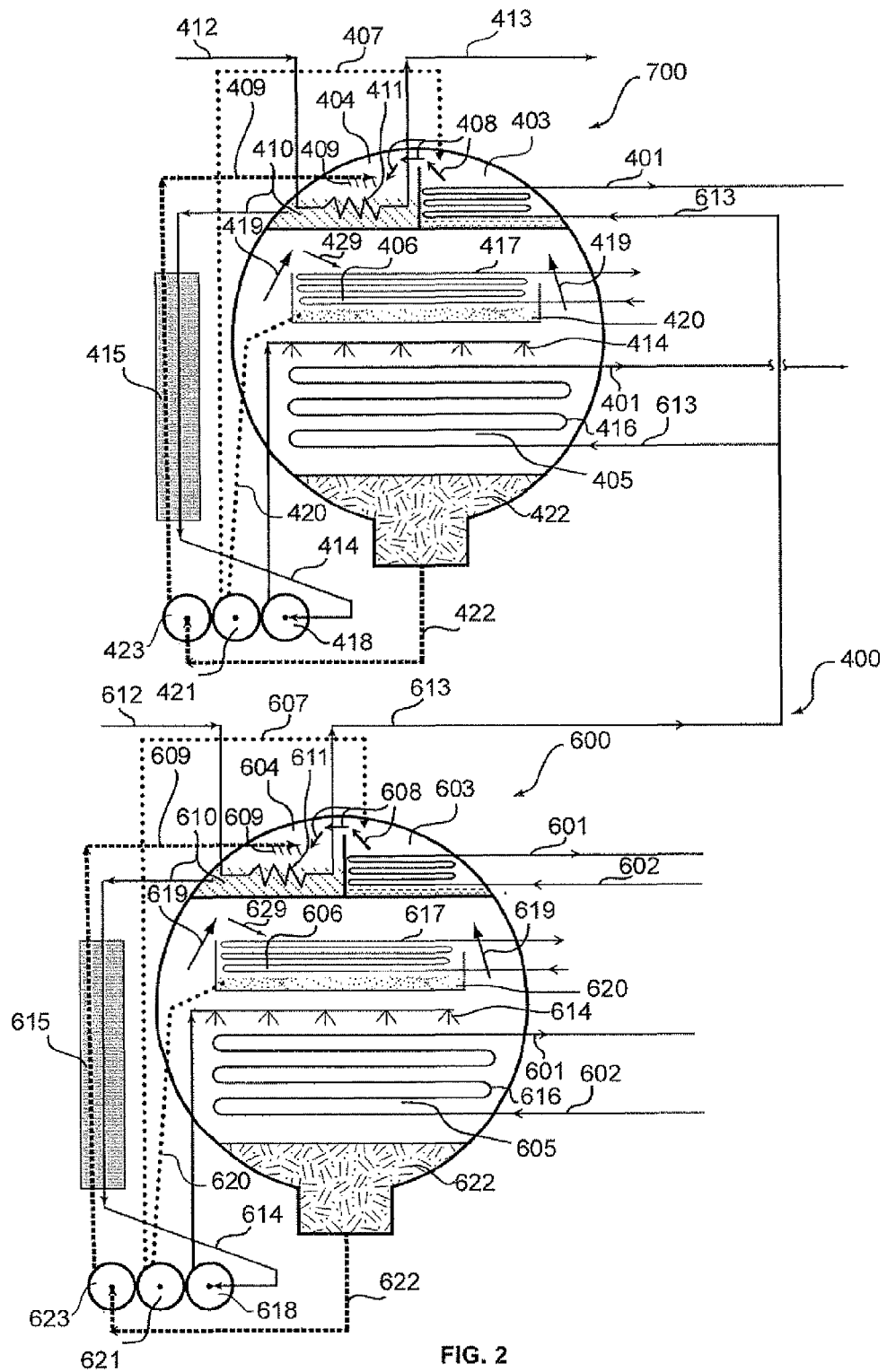
FIG. 2 is a schematic representation of a basic configuration of the application of a double effect absorption heat transformer for producing steam, according to an embodiment of the present invention.

FIG. 2 represents a double stage (also interchangeably referred herein as "two stage" or "double effect") absorption heat transformer 400, thermally connected to the heat pipes of at least one polymerization reactor (not shown), according to another embodiment of the invention.

The cooling water 602 coming out of the polymerization reactor is thermally connected to a first absorption heat transformer 600, wherein said cooling water 602 is cooled and is returned cooled 601 to reactor. Optionally, the cooling water can also be thermally connected in parallel to a separate cooling system (not shown) such as evaporative coolers. This has the advantage of having a backup system when the absorption heat transformer is down for maintenance for example.

The first absorption heat transformer 600 includes a first evaporator 603, a first absorption section 604, a first generator 605 and a first condenser 606. Cooling water 602 from the reactor is in thermal contact with the first evaporator 603 and the first generator 605 and is used to heat both first evaporator 603 and generator 605. The absorption heat transformer uses an absorbate/absorbent binary fluid as working fluid.

A condensed absorbate is metered 607 into the first evaporator 603. The heat from the cooling water 602 in thermal contact with the first evaporator 603 evaporates the absorbate to create absorbate vapor schematically illustrated by arrows 608. The cooling water is therefore cooled by thermal contact with the first evaporator 603 and is returned to cool the reactor as shown by arrows 601.

The absorbate vapor 608 enters the first absorber 604. In the first absorber 604, the introduced absorbent solution 609 readily absorbs the absorbate vapor 608. As the absorbent solution 610 absorbs the absorbate, it becomes diluted hereinafter referred as "weak absorbent solution", "weak solution" or "diluted solution" 610.

The weak solution 610 is cooled in a first heat exchanger 611 comprised in the first absorber 604. The heat from the weak solution 610 is used in said first heat exchanger 611 to produce steam 613 from a steam condensate 612 recovered from the polymerization unit. The cooled weak solution 610 is sent to a first economizer 615 where it is further cooled by heat exchange. The further cooled weak solution 614 is sent to the first generator 605 through expansion valve 618.

The first generator 605 includes a heat pipe 616 through which circulate water 602 from the reactor 600. The first generator 605 is also in contact with a first condenser 606. The first condenser 606 uses a stream of cool water usually from a cooling system 617. The weak solution 614 is introduced into the first generator 605 where it is boiled. The boiling action changes the absorbate to an absorbate vapor 619 which leaves the weak solution which becomes concentrated 622 upon boiling. Absorbate vapor 619 is attracted to the first condenser 606 coils 617. Preferably cold water circulates through coils 617. The absorbate vapor is condensed 629 to a liquid pond 620 where it gathers. The condensed absorbate 620 is pressurized with pump 621. The pressurized condensed absorbate 607 is returned to the first evaporator section 603. The absorbent solution becomes concentrated 622 and is pumped 623 back through a first economizer 615 where it is preheated. In the first economizer 615, heat is exchanged between the weak solution 610 and the concentrated solution 622. The preheated absorbent solution 609 is then returned to the first absorber 604.

The steam 613 produced using the first absorption heat transformer 600 is used as a hot source for a second absorption heat transformer 700, and said second absorption heat transformer 700 is used to produce steam 413 from a steam condensate 412 recovered from the polymerization process unit (not shown).

The steam 613 produced using the first absorption heat transformer 600 is thermally contacted with a condensed absorbate 407 in a second evaporator 403, whereby the condensed absorbate 607 is vaporized to form vapor absorbate 408. Said vapor absorbate 408 is introduced in a second absorber 404. In the second absorber 404, the introduced absorbent solution 409 readily absorbs the absorbate vapor 408. As the absorbent solution 410 absorbs the absorbate, it becomes diluted (hereinafter interchangeably referred as the "weak solution" or "diluted solution" 410).

The weak solution 410 is cooled in a second heat exchanger 411 comprised in the second absorber 404. The heat from the weak solution 410 is used in said heat exchanger 411 to produce steam 413 from a steam condensate 412 recovered from the polymerization unit, The cooled weak solution 410 is sent to a second economizer 415 where it is further cooled by heat exchange and the further cooled weak solution 414 is sent to a second generator 405 through expansion valve 418.

The second generator 405 includes a heat pipe 416 through which circulate steam 613 produced using the first absorption heat transformer. The second generator 405 is also in contact with a second condenser 406. The second condenser 406 requires a stream of cool water usually from a cooling system 417. The weak solution 414 is introduced into the second generator 405 where it is boiled. The boiling action changes the absorbate to a vapor absorbate 419 which leaves the weak solution which becomes concentrated 422 upon boiling. Absorbate vapor 419 is attracted to the second condenser 406 coils 417. Preferably cold water circulates through coils 417. The absorbate vapor is condensed 429 to a liquid pond 420 where it gathers and is pumped back with pump 421 to the second evaporator 403. The absorbent solution becomes concentrated 422 and is pumped 423 back through a second economizer 415 where it is preheated. In the second economizer 415 heat is exchanged between the weak solution 410 and the concentrated solution 422. The preheated absorbent solution 409 is then returned to the second absorber 404.

The system according to FIG. 2, using the double effect absorption heat transformer allows the efficient use of heat generated during the polymerization reaction to produce steam, preferably high pressure steam from a steam condensate recovered from the polymerization unit.

While the invention has been described in terms of the presently preferred embodiment, reasonable variations and modifications are possible by those skilled in the art and such variations are within the scope of the described invention and the appended claims.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Use of Single Stage Absorption Heat Transformer for Producing Steam by Recovering the Thermal Energy from the Cooling Water at 83° C. of a Polymerization Reactor A system according to an embodiment of the present invention comprises a polymerization reactor thermally connected with a single stage absorption heat transformer using an aqueous solution of lithium bromide as binary working fluid.

Figure 3:
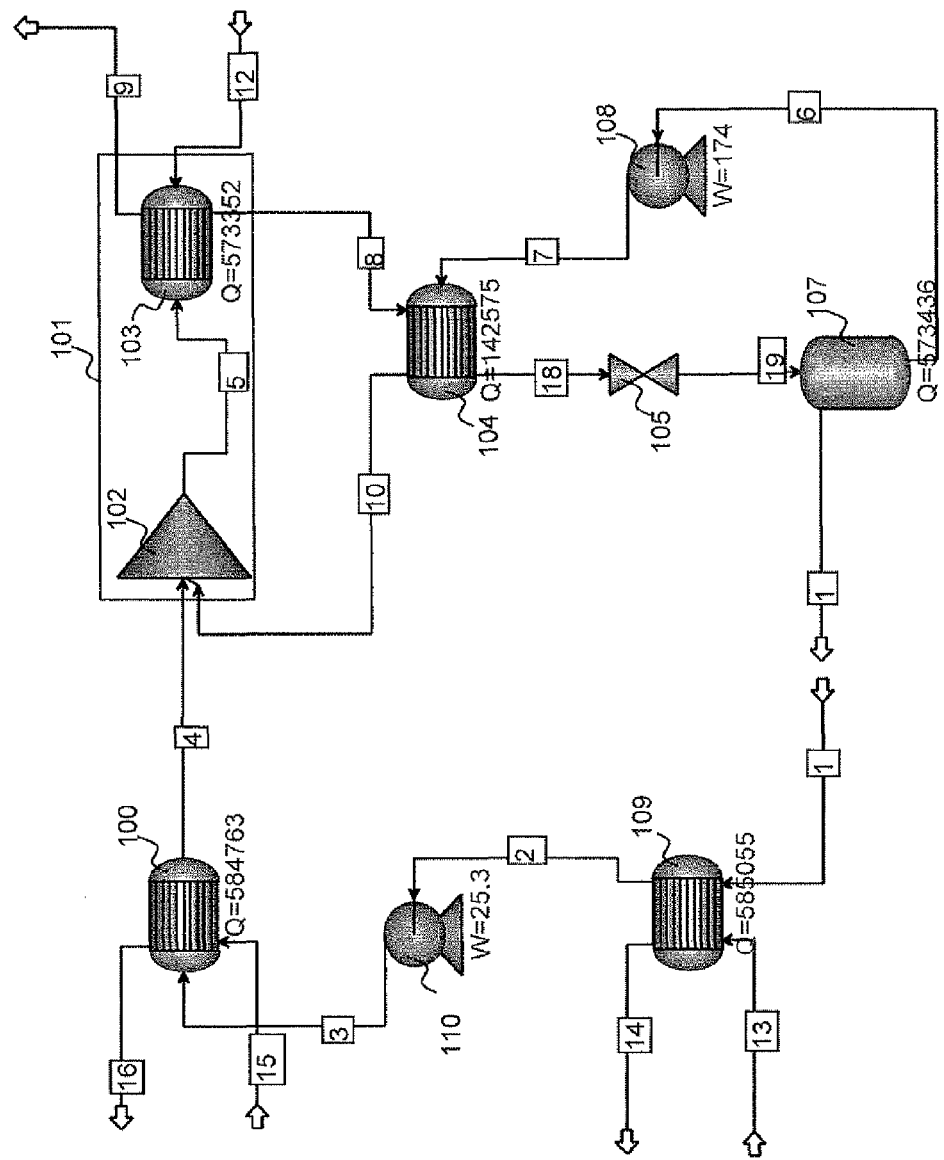
FIG. 3 represents a schematic drawing of the basic configuration of a single effect absorption heat transformer, according to an embodiment of the present invention.

FIG. 3 represents a schematic drawing of the basic configuration according to the invention of the absorption heat transformer, wherein Q is Duty (Watt) and P is Power (Watt). The heat transformer comprises a circulation unit to provide an absorption cycle including an evaporator 100; an absorber 101, a generator 107; a condenser 109; and a heat exchanger 104 (economizer) between the solution passages to and from the absorber 101 and the generator 107. Hot cooling water 15 from the reactors is used to heat the first generator 107 and the first evaporator 100 of the absorption pump. Said hot cooling water 15 is thereby cooled using said absorption heat transformer and is returned 16 to the reactor to cool the polymerization reaction.

Part of the heat from the cooling water 15 at a temperature of 83° C. is provided to the evaporator 100 which evaporates the absorbate (water) to create water vapor schematically illustrated at 4, and which is sent to an absorption section 101, which comprises the absorber 102 per se and a heat exchanger 103. The absorber (mixer) 102 is used to mix and provoke the absorption of the water vapor 4 in the concentrated solution 10 (which are in different phases).

In the absorption section 101, the absorbent solution (lithium bromide solution) 10 has a lower vapor pressure than that of the evaporated water from section 100, and readily absorbs the water vapor 4 into the solution. As the lithium bromide solution absorbs water, it becomes diluted 5 (herein after referred as weak solution 5).

The absorption section 101, also comprises the heat exchange unit 103 which uses the heat produced during the absorption process to produce steam 9 from a steam condensate 12 recovered from the polymerization process unit. The absorption of water vapor 4 by the concentrated solution 10 liberates a quantity of heat which will be recovered in the heat exchange unit (heat exchanger) 103 by the condensate 12 at 90° C., to produce steam 9.

The weak solution 8 is then conveyed through an economizer 104 where it is further cooled 18 and subsequently expended in an expansion valve 105 before being sent 19 to the generator 107.

Part of the heat from the cooling water is provided to the generator 107 at a temperature of 83° C. to vaporize the water in the weak solution 19. The steam 1 produced in the generator 107 is sent to a condenser 109. The concentrated lithium bromide solution 6 in the generator 107 is pumped 7 by pump 108 to the economizer 104 to preheat the concentrated solution.

The best working conditions are obtained when using a concentrated lithium bromide solution at a concentration of about 60% of lithium bromide by weight in water and when the pressure in the generator is about 0.05 bar.

The preheated concentrated solution 10 is returned to the absorber 102. The water vapor 1 is sent to the condenser 109 where it is condensed by cold source 13. According to the present invention, best results are measured when the cold source 13 in the condenser 109 is at maximum 20° C. In this example the steam 1 produced in the generator 107 is sent to the condenser 109 and cooled to a temperature of about 30° C.

The condensed water 2 is then compressed to high pressure by a pump 110 and returned to the evaporator 100. Preferably the condensed water 2 is pressurized to 0.37 bar using the pump 110.

Part of the heat from the cooling water 15 from the polymerization reactor at a temperature of 83° C. is provided to the evaporator 100 which evaporates the condensed water to create water vapor 4. Preferably the evaporator 100 is under a pressure of about 0.37 bar. The condensed water 3 is evaporated at about 75° C.

The water vapor 4 is admitted to the absorber 101 where it is absorbed by the concentrated solution 10 closing the cycle.

Table 1 presents the temperature, pressure, flow rate, vapor fraction of the different flow of the system according to the embodiment of the present invention illustrated in FIG. 3.

TABLE 1

| Flow | Temperature (° C.) | Pressure (bar) | Mass Flow rate (kg/s) | Mole Flow rate (kmol/s) | Mass Fract LiBr (% W) | Molar vapor Fraction |
|---|---|---|---|---|---|---|
| 1 | 75 | 0.05 | 1.3 | 0.07 | 0 | 1 |
| 13 | 20 | 1.013 | 112 | 6.2 | 0 | 0 |
| 14 | 27 | 1.013 | 112 | 6.2 | 0 | 0 |
| 2 | 30 | 0.05 | 1.3 | 0.07 | 0 | 0 |
| 3 | 30 | 0.37 | 1.3 | 0.07 | 0 | 0 |
| 15 | 83 | 1.013 | 158 | 8.77 | 0 | 0 |
| 16 | 78 | 1.013 | 158 | 8.77 | 0 | 0 |
| 4 | 75 | 0.37 | 1.3 | 0.07 | 0 | 1 |
| 10 | 100 | 0.37 | 18.24 | 0.66 | 60.1 | 0 |
| 5 | 122 | 0.37 | 19.54 | 0.73 | 56.3 | 0.08 |
| 8 | 102 | 0.37 | 19.54 | 0.73 | 56.3 | 0 |
| 18 | 80 | 0.37 | 19.54 | 0.73 | 56.3 | 0 |
| 19 | 68 | 0.05 | 19.54 | 0.73 | 56.3 | 0.01 |
| 6 | 75 | 0.05 | 18.24 | 0.66 | 60.1 | 0 |
| 7 | 75 | 0.37 | 18.24 | 0.66 | 60.1 | 0 |
| 12 | 90 | 1.013 | 1.4 | 0.077 | 0 | 0 |
| 9 | 102 | 1.013 | 1.4 | 0.077 | 0 | 1 |

Table 1 shows that when using the reactor's cooling water at 83° C., low pressure steam (1 bar) at 102° C. can be generated with a flow rate of 1.4 kg/s or 5 tons/h.

The coefficient of performance of the cycle is: COP=573, 296.48/(584710.00+573406.42)=0.49.

The use of the absorption heat transformer allows us to produce low pressure steam (1 bar) with satisfactory rate, for instance with a flow rate of cooling water of about 1000 m$^3$/h and cooling water temperature of 78° C., 83° C. and 88° C., the steam flow rate is respectively of 4.5 tons/h, 5 tons/hr and 5.5 tons/h.

The steam produced using the absorption heat transformer is low pressure steam. To obtain high pressure steam a thermocompressor is used.

Thermocompressors are used to entrain and compress a low-pressure fluid to an intermediate reusable pressure/temperature.

Thermocompressors use high-pressure steam or gas as a motive fluid. In the present example the motive fluid is high-pressure steam at 189° C. and 12 bar that is available on site. The motive fluid enters a steam chest and expands through a converging diverging nozzle. The high velocity fluid entrains a the low pressure steam at 102.2° C. and 1 bar entering at a suction inlet, forcing both into a mixing chamber where the two fluids are combined. The mixed fluids are then recompressed to an intermediate pressure at 120° C. and 2 bar through a diffuser, which functions as a nozzle in reverse, reconverting velocity energy to pressure energy. The best results are obtained with a ratio of flow rate (flow rate motive/flow rate low pressure steam) of 0.28.

The coupling of at least one absorption heat transformer with one thermocompressor to produce high pressure steam is particularly cost advantageous as the thermocompressor does not necessitate any energy input.

Example 2

Use of Double Stage Absorption Heat Transformer for Producing Steam by Recovering the Thermal Energy from the Cooling Water at 83° C. of a Polymerization Reactor A system according to an embodiment of the present invention comprises a polymerization reactor thermally connected with a double stage absorption heat transformer using an aqueous solution of lithium bromide as binary working fluid.

Figure 4:
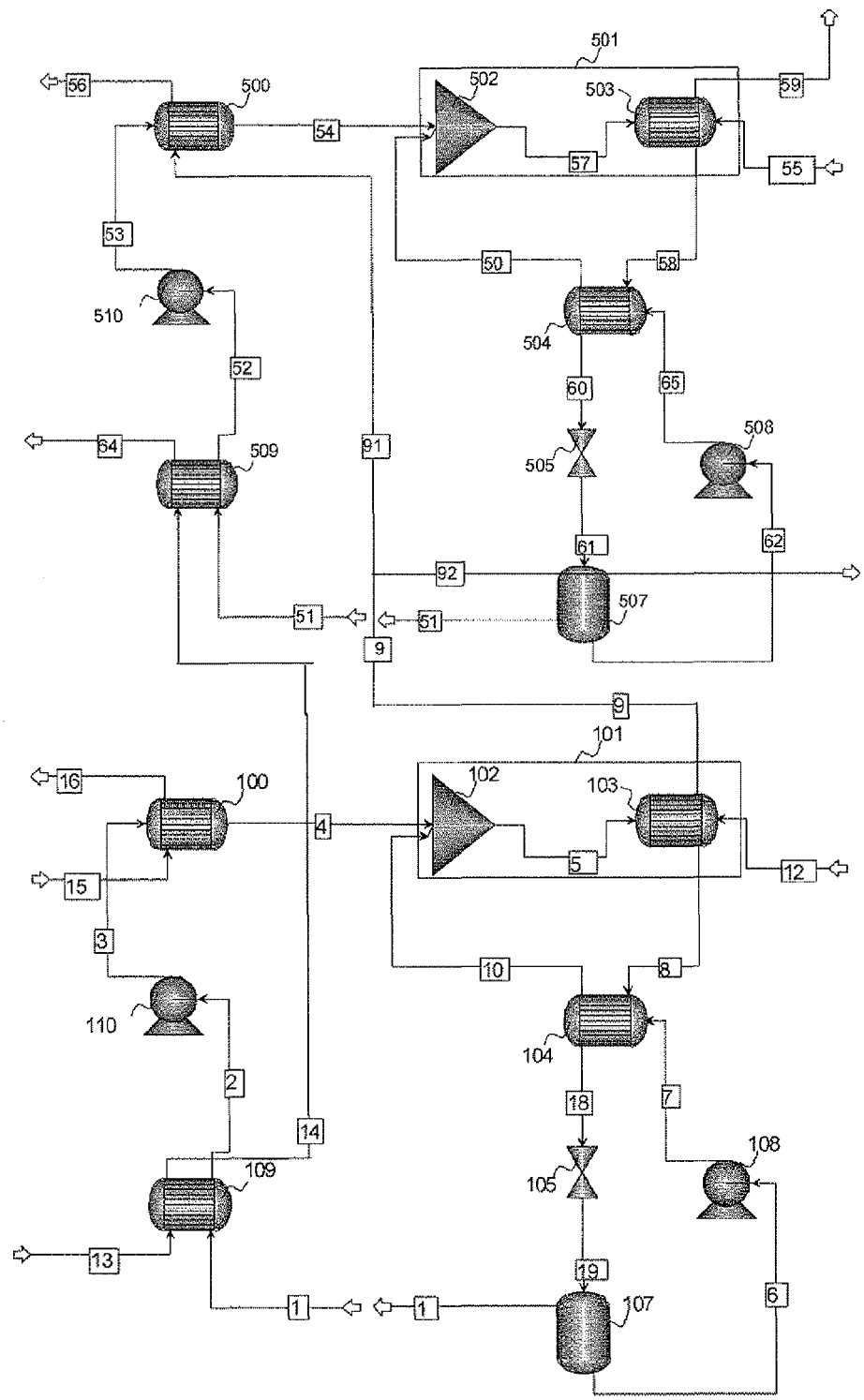
FIG. 4 represents a schematic drawing of the basic configuration of a double effect absorption heat transformer, according to an embodiment of the present invention.

FIG. 4 represents a schematic drawing of the basic configuration according to the invention of the double stage absorption heat transformer. The heat transformer comprises two circulation units to provide two absorption cycles, the first absorption cycle including a first evaporator 100; a first absorber 101, a first generator 107; a first condenser 109; and a first heat exchanger 104 (economizer) between the solution passages to and from the first absorber 101 and the first generator 107, the second absorption cycle including a second evaporator 500; a second absorber 501, a second generator 507; a second condenser 509; and a second heat exchanger 504 (economizer) between the solution passages to and from the second absorber 501 and the second generator 507, the first and the second absorption cycles being thermally connected through the pipes of the steam produced using the first absorption cycle. Hot cooling water 15 from the reactors is used to heat the first generator 107 and the first evaporator 100 of the first absorption unit. Steam produced in the first absorption cycle is used to heat the second generator 507 and the second evaporator 500 of the second absorption cycle. The hot cooling water 15 is thereby cooled using the first absorption cycle and is returned 16 to the reactor cool the polymerization reaction.

The lithium bromide weak solution 19 in the first absorption cycle is heated in the generator 107 by the heat from the cooling water 15 (not shown) to generate a water vapor 1, and concentrated lithium bromide solution 6. The concentrated lithium bromide solution 6 is delivered to the absorber 101 through the heat exchanger 104 by the pumping action of the pump 108. The water vapor 11 generated in the generator 107 enters into the condenser 109 to be condensed. The condensed water vapor 2 is compressed and pumped 110 into the evaporator 100 to be evaporated 4. The heat of evaporation needed in the evaporator 100 is transferred from the heat of the cooling water 15 of the reactor.

In the absorber 102, the concentrated lithium bromide solution 10 absorbs the water vapor 4 evaporated in the evaporator 100, and after being diluted by water absorption, the diluted lithium bromide solution 5 is cooled in the heat exchanger 103, which is used to produce steam 9 from steam condensate 12 (available on site).

The diluted solution 58 is metered into the economizer 104 where it is further cooled before returning 18 to the generator 107. In the generator the diluted solution 19 is boiled to generate water vapor 1, and concentrated lithium bromide solution 9.

The steam 9 produced in the first absorption unit is further used in the second absorption cycle.

Part of the heat from the steam 9 is provided to the second evaporator 500 which evaporates the absorbate (water) to create water vapor 54. Water vapor 54 is sent to a second absorption section 501, which comprises a second absorber 502 per se and a second heat exchanger 503. The second absorber (mixer) 502 is used to mix and provoke the absorption of the water vapor 54 in the concentrated solution 50 (which are in different phases).

In the second absorption section 501, the absorbent solution (lithium bromide solution) 50 has a lower vapor pressure than that of the evaporated water from section 500, and readily absorbs the water vapor 54 into the solution. As the lithium bromide solution absorbs water, it becomes diluted 57 (herein after referred as weak solution 57).

The second absorption section 501, also comprises the second heat exchange unit 503 which uses the heat produced during the absorption process to produce high pressure steam 59 from a steam condensate 55 recovered from the polymerization process site. The absorption of water vapor 54 by the concentrated solution 50 liberates a quantity of heat which will is recovered in the second heat exchange unit (heat exchanger) 503 by the condensate 55, to produce steam 59.

The weak solution 58 is then conveyed through a second economizer 504, where it is further cooled 60 and subsequently expended in an expansion valve 505 before being sent 61 to the second generator 107.

Part of the heat from steam 9 generated using the first absorption cycle is provided to the second generator 507 to vaporize the water in the weak solution 61.

The best working conditions are obtained when using a concentrated lithium bromide solution at a concentration of about 66.1% of lithium bromide by weight in water and when the temperature in the second generator 507 is 95° C. and the pressure in the second generator 507 is about 0.088 bar.

The steam 51 produced in the second generator 507 is sent to a second condenser 509. The concentrated lithium bromide solution 62 in the second generator 507 is pumped 65 by pump 508 to the economizer 504 to preheat the pumped concentrated solution 65.

The preheated concentrated solution 50 is returned to the absorber 502. The water vapor 51 is sent to the condenser 509 where it is condensed by the cold source 14 coming out of the first condenser 109.

The condensed water 52 is then compressed to high pressure by a pump 510 and returned 53 to the evaporator 500, where it is evaporated 54 before being admitted into the absorption unit 501 closing the cycle.

The steam produced using the second absorption cycle is around 2 bar.

Table 2 presents the temperature, pressure, flow rate, vapor fraction of the different flow of the system according to the embodiment of the present invention illustrated in FIG. 4.

TABLE 2

| Flow | Temperature (° C.) | Pressure (bar) | Mass Flow rate (kg/s) | Mass Fract LiBr (% W) | Vapor Fraction |
|---|---|---|---|---|---|
| First absorption cycle | | | | | |
| 1 | 75 | 0.049 | 1.3 | 0 | 1 |
| 2 | 30 | 0.049 | 1.3 | 0 | 0 |
| 3 | 30 | 0.370 | 1.3 | 0 | 0 |
| 4 | 75 | 0.370 | 1.3 | 0 | 1 |
| 5 | 122 | 0.370 | 19.56 | 56.1 | 0.08 |
| 6 | 75 | 0.049 | 18.26 | 60.1 | 0 |
| 7 | 75 | 0.370 | 18.26 | 60.1 | 0 |
| 8 | 102 | 0.370 | 19.56 | 56.1 | 0 |
| 9 | 104.5 | 1.013 | 1.4 | 0 | 1 |
| 10 | 100 | 0.370 | 18.26 | 60.1 | 0 |
| 12 | 90 | 1.013 | 1.4 | 0 | 0 |
| 13 | 20 | 1.013 | 112 | 0 | 0 |
| 14 | 27 | 1.013 | 112 | 0 | 0 |
| 15 | 83 | 1.013 | 158 | 0 | 0 |
| 16 | 78 | 1.013 | 158 | 0 | 0 |
| 18 | 80 | 0.370 | 19.56 | 56.1 | 0 |
| 19 | 68 | 0.049 | 19.56 | 56.1 | 0.01 |
| Second absorption cycle | | | | | |
| 51 | 95 | 0.088 | 0.7 | 0 | 1 |
| 52 | 43 | 0.088 | 0.7 | 0 | 0 |
| 53 | 43 | 0.840 | 0.7 | 0 | 0 |
| 54 | 95 | 0.840 | 0.7 | 0 | 1 |
| 50 | 100 | 0.840 | 9.48 | 63.1 | 0 |
| 57 | 150.9 | 0.840 | 10.18 | 58.7 | 0.05 |
| 58 | 102 | 0.840 | 10.18 | 58.7 | 0 |
| 60 | 97.6 | 0.840 | 10.18 | 58.7 | 0 |
| 61 | 85 | 0.088 | 10.18 | 58.7 | 0.01 |
| 62 | 95 | 0.088 | 9.48 | 63.1 | 0 |
| 65 | 95 | 0.840 | 9.48 | 63.1 | 0 |
| 92 | 104 | 1.013 | 0.67 | 0 | 1 |
| 91 | 104 | 1.013 | 0.72 | 0 | 1 |
| 64 | 30.7 | 1.013 | 112 | 0 | 0 |
| 56 | 72 | 1.013 | 0.72 | 0 | 0 |
| 55 | 90 | 2 | 0.76 | 0 | 0 |
| 59 | 124.3 | 2 | 0.76 | 0 | 1 |

This double stage system allows to obtain steam 59 at 2 bar and at a high temperature of 124° C. with a flow rate of about 2.7 tons/h for a cooling water flow rate of 1000 m³/h and a temperature 83° C.

The coefficient of performance of the double stage absorption cycles is 0.27.

Comparison with WO2009/010514

The Coefficient of Performance used in WO2009/010514 is the ratio of the quantity of heat produced to the electrical energy consumed (Example 1 of WO2009/010514). In WO2009/010514, the energy recovered from the cooling water of the polymerization reactor is reused at a higher temperature, but at the cost of added mechanical energy. This will be shown below.

For instance, taking the first line of Table 1, part of Example 1 of D1, 62.42 kW of steam is produced by consuming 16.31 kW of electrical power. When looking to the $CO_2$ emission in this case, with the usual efficiency of 90% in a boiler and 40% for electricity generation in a conventional power station fuelled with gas, diesel or coal, we find the following equivalences:

$W$=16.31 kW equivalent to 16.31/0.4=40.78 $CO_2$ emission $Q_{rec}$=62.42 kW equivalent to 62.42/0.9=69.36 $CO_2$ emission.

Therefore, the Coefficient of Performance expressed as equivalent primary energy:

$Q_{rec}/W$=69.36/40.78=1.70.

Note that: $Q_{evap}$=42.74 kW equivalent to 42.74/0.9=47.49 $CO_2$ emission (but this term is actually zero for the purposes of the COP expressed as equivalent primary energy, since this energy is wasted heat)

Similarly, with the first line of Table 2, part of Example 1 of D1, the comparison becomes:

$W$=15.24 kW equivalent to 15.24/0.4=38.10 $CO_2$ emission $Q_{rec}$=39.34 kW equivalent to 39.34/0.9=43.71 $CO_2$ emission.

The Coefficient of Performance expressed as equivalent primary energy:

$Q_{rec}/W$=43.71/38.10=1.15.

Note that: $Q_{evap}$=24.10 kW equivalent to 24.1/0.9=26.78 $CO_2$ emission (but this term is actually zero for the purposes of the COP expressed as equivalent primary energy, since this energy is wasted heat)

From Example 1 of the present invention, it is shown that only 200 W of mechanical or electrical power is enough to recover 573 kW of thermal energy.

$W$=0.2 kW equivalent to 0.2/0.4=0.5 $CO_2$ emission $Q_{rec}$=573 kW equivalent to 573/0.9=636.67 $CO_2$ emission.

The Coefficient of Performance expressed as equivalent primary energy $Q_{rec}/W$=636.67/0.5=1273

Therefore, in equivalent $CO_2$ emission, the Absorption Heat Transformer is superior.

This indicates that predominantly thermal energy comes into play in the present invention, which is a distinctive advantage compared to WO 2009/10514 which requires a large input of mechanical/electrical energy.

The invention claimed is:

1. Process for producing steam using heat recovered from a polymerization reaction for producing polyolefin, comprising the steps of:
   (a) thermally contacting said polymerization reaction with a cooling fluid such that the cooling fluid removes heat from said reaction,
   (b) thermally contacting at least part of said cooling fluid with at least one absorption cycle utilizing an absorbate and an absorbent solution, thereby transferring heat from the cooling fluid to said absorption cycle, using said cycle to produce steam from a condensate, wherein the absorption cycle comprises
      i) vaporizing a condensed absorbate using heat from said cooling fluid, thereby generating absorbate vapor,
      ii) exposing the absorbate vapor to the absorbent solution such that absorbate vapor is absorbed by the absorbent solution thereby diluting the absorbent solution and producing a diluted absorbent solution,
      iii) removing at least part of the heat from said diluted absorbent solution and using said removed heat to produce steam from a condensate thermally connected to said absorption cycle,
      iv) using heat from the cooling fluid to heat the diluted absorbent solution to a temperature sufficient to vaporize the absorbate to produce a absorbate vapor and a concentrated absorbent solution; returning the absorbent solution back to be used in the absorption step (ii)

v) condensing the absorbate vapor to form a condensed absorbate and returning the condensed absorbate to be vaporized in step (i).

2. Process according to claim 1, further comprising the step of further removing at least part of the heat from said diluted absorbent solution after step (iii) and using said removed heat to heat the concentrated absorbent solution obtained in step (iv) before returning said concentrated absorbent solution to the absorption step (ii).

3. Process according to claim 1, wherein said at least one absorption cycle comprises two pressure zones.

4. Process according to claim 1, wherein the steam produced in step (b) is further pressurized using a thermocompressor.

5. Process according to claim 1, further comprising the step of using the steam produced in step (iii) of a first absorption cycle as a hot source for a second absorption cycle, and using said second absorption cycle for producing steam from a condensate.

6. Process according to claim 5, wherein said second absorption cycle comprises two pressure zones.

7. Process according to claim 5, wherein said second absorption cycle utilizes a absorbate and an absorbent solution, and comprises the steps of:
  i1) vaporizing a condensed absorbate using heat from the steam produced using the first absorption cycle, thereby generating absorbate vapor,
  ii1) exposing the absorbate vapor to the absorbent solution such that absorbate vapor is absorbed by the absorbent solution thereby diluting said absorbent solution and producing a diluted absorbent solution,
  iii1) removing at least part of the heat from said diluted absorbent solution and using said removed heat to produce steam from a condensate thermally connected to said absorption cycle,
  iv1) using heat from the steam produced using the first absorption cycle, to heat the diluted absorbent solution to a temperature sufficient to vaporize the absorbate to produce an absorbate vapor and a concentrated absorbent solution; returning the concentrated absorbent solution back to be used in the absorption step (ii1)
  v1) condensing the absorbate vapor to form a condensed absorbate and returning the condensed absorbate to be vaporized in step (i1).

8. Process according to claim 7, further comprising the step of further removing at least part of the heat from said diluted absorbent solution after step (iii1) and using said removed heat to heat the concentrated absorbent solution obtained in step (iv1) before returning said concentrated absorbent solution to the absorption step (ii1).

9. Process according to claim 5, wherein said steam produced in step (iii1) is high pressure steam.

10. Process according to claim 1, wherein said absorbate is water and said absorbent solution is a solution of LiBr in water.

11. Process according to claim 10, wherein the concentration of the LiBr absorbent solution is at least 58% by weight.

12. Process according to claim 11, wherein the concentration of the LiBr absorbent solution is ranging from 58% to 65% by weight.

13. Process according to claim 1, wherein the polymerization reaction is performed in a reactor and comprises the steps of
  introducing into said reactor one or more olefin reactants, polymerization catalysts and diluents, and while circulating said reactants, catalysts and diluents,
  polymerizing said one or more olefin reactants to produce a polymer slurry comprising essentially liquid diluent and solid olefin polymer particles,
  controlling the reactor temperature using the cooling fluid and recovering at least a portion of the thermal energy from said cooling fluid using an absorption cycle in thermal contact with said cooling fluid,
  allowing said polymer slurry to settle, and
  discharging the settled polymer slurry out of said reactor.

* * * * *